Nov. 19, 1946.    H. C. PARKER ET AL    2,411,386
APPARATUS FOR CLARIFYING AND PURIFYING LIQUIDS
Filed Feb. 3, 1943    2 Sheets-Sheet 1
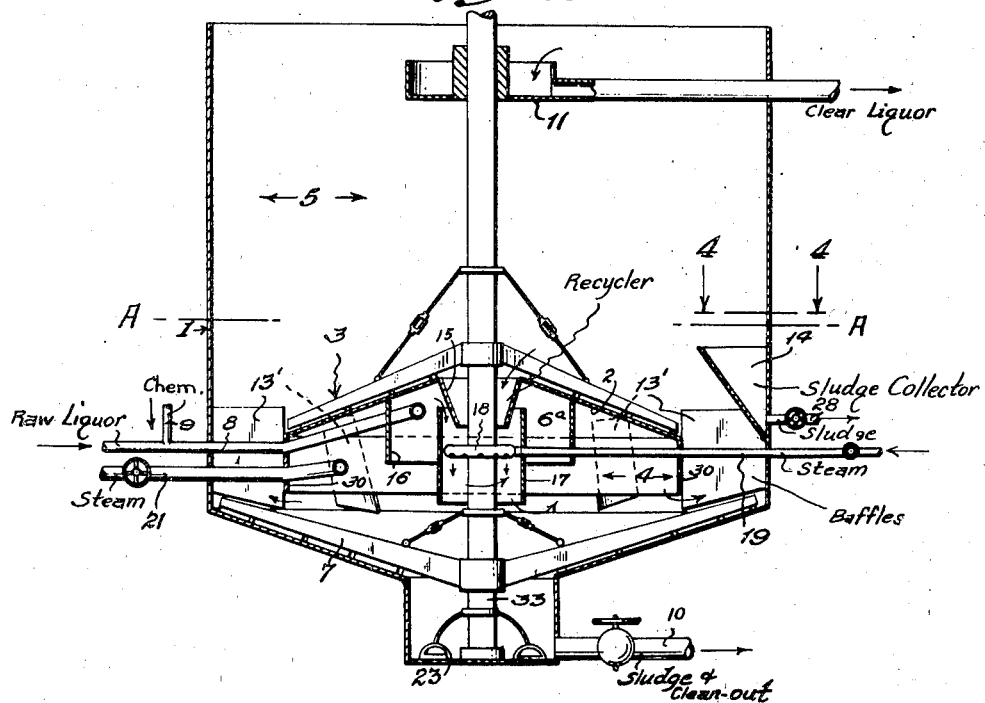
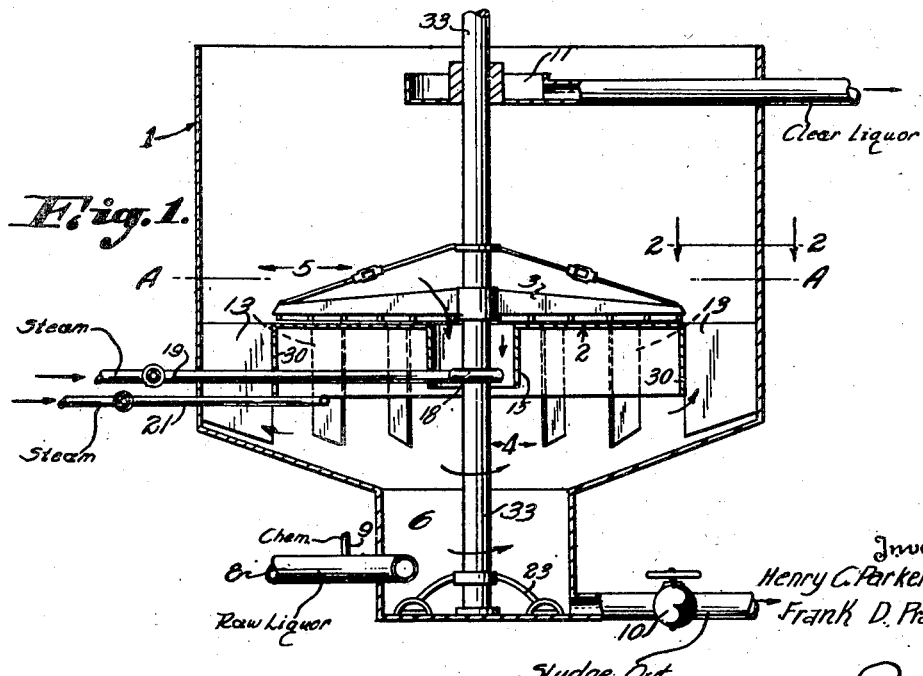
Inventors,
Henry C. Parker &
Frank D. Prager
Henry C. Parker
Attorney

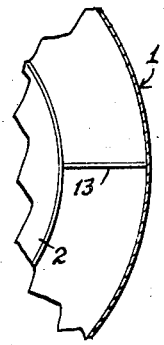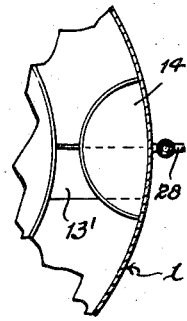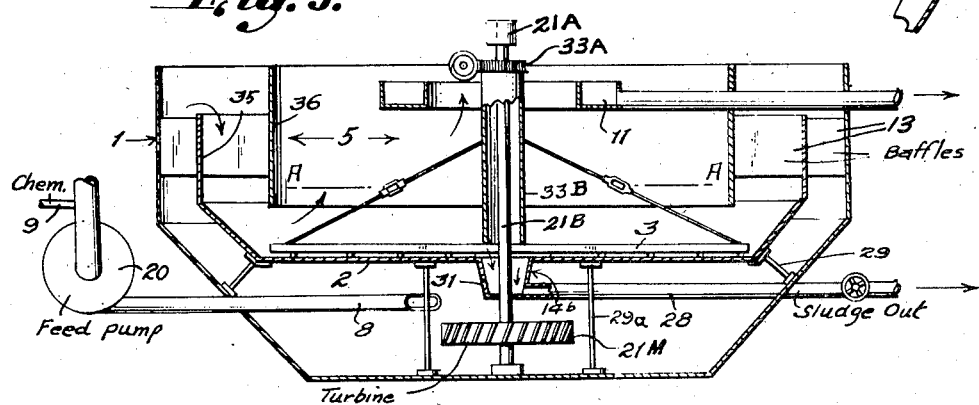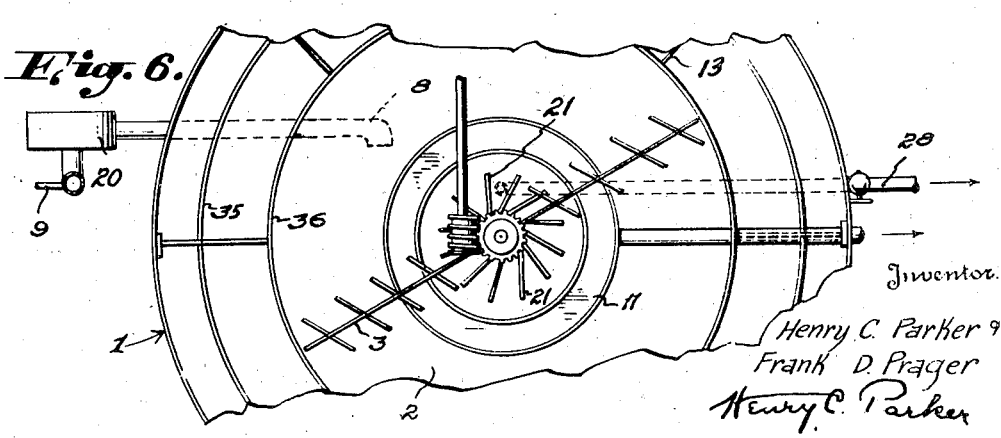

Patented Nov. 19, 1946

2,411,386

UNITED STATES PATENT OFFICE 2,411,386

APPARATUS FOR CLARIFYING AND PURIFYING LIQUIDS

Henry C. Parker, Washington, D. C., and Frank D. Prager, Chicago, Ill., assignors to Graver Tank & Mfg. Co., Inc., a corporation of Delaware Application February 3, 1943, Serial No. 474,564

6 Claims. (Cl. 210—16)

This invention relates to apparatus for clarifying and purifying liquids.

It is a primary object of our invention to provide an improved combination of mixing and clarifying means, in a single tank.

A particular object is, to provide mixing means in a lower or mixing compartment of the tank, to separate an upper or clarification compartment from said lower one by a substantially horizontal tray, to arrange for a liquid circulation in and between said compartments, to enforce suitable flow velocities for rapid clarification in said upper compartment, by stilling baffles, said stilling baffles being installed between said compartments, and to suitably and separately remove treated liquid and separated solids from the tank.

A still more particular object is to utilize said stilling baffles as a structural support of the horizontal tray, and of other parts.

A general object is to provide simplicity and economy, with a high degree of efficiency. Simplicity and economy are attained by the design wherein a substantially horizontal tray separates the lower mixing compartment from the upper clarification compartment, with a recycling device centrally arranged. While this design is basically known to the art, we have discovered an improvement thereon, materially increasing its efficiency while not sacrificing its basic advantages. We found that, for best results, we require substantial agitation in the mixing compartment below this tray, and that this agitation must be reduced to a large extent before the liquid enters the upper or clarification compartment, on each of the recycling flows. While a positive recycling flow is required above the tray as well as below it, we provide for much greater velocities thereof in the lower compartment. For this purpose we install substantially vertical, radial stilling baffles in the annular, peripheral space between the superposed compartments. As a result we can safely provide a liquid agitation by rapid, horizontal rotation beneath the tray, without adverse effect on the sludge-clear liquor interface above the tray. Of course, stilling baffles are well-known in other combinations, but we believe we are the first to discover the useful function thereof in the present combination, where such baffles are arranged in the peripheral space as mentioned.

Our invention can be explained in greater detail by reference to the accompanying drawings which show, more or less diagrammatically, several embodiments of apparatus within our invention. In this showing, Fig. 1 is a vertical cross section through one of our clarifiers, Fig. 2 is a partial horizontal section, taken along the line 2—2 of Fig. 1, Fig. 3 is a vertical section through a modification of our clarifier, Fig. 4 is a partial horizontal section, showing the mounting of the sludge collector, taken along the line 6—6 of Fig. 3, Fig. 5 is a vertical section through another modification of our clarifier, while Fig. 6 is a plan view of the clarifier of Fig. 5.

In the various figures of the drawings, like parts are indicated by like reference numerals. Many of the structural elements are common to all embodiments shown in the figures. Referring first to Figs. 1 and 2, a cylindrical tank is shown generally at 1. A substantially flat, circular false bottom or tray 2 is horizontally and concentrically installed in said tank and scrapers 3 are provided operating on the tray. The mixing zone or compartment beneath the tray is indicated at 4 and the clarifying zone or compartment above the tray at 5.

A raw water inlet is shown at 8 with a chemical inlet pipe at 9, both below the tray. The sludge draw-off is indicated at 10, while the clear liquor draw-off is shown at 11 at the top of the tank.

It will be noted that this tank is provided with a preliminary mixing zone 6 which is in the form of a sump and into which the raw liquor, mixed with chemicals, is introduced tangentially.

The tray 2 is slightly spaced from the wall of the tank; and it has a central opening or recycler 15, whereby there is formed a continuous, annular, peripheral opening or flow channel between the compartments 4 and 5 and a central opening or flow channel between the same compartments. In the annular, peripheral channel between the tray and the tank wall substantially radial, vertical stilling baffles 13 are provided, these baffles being secured to the wall of the tank and to the tray and supporting the tray. The scrapers or sweeps 3 operating on top of the tray are preferably adapted to move the sludge which settles on the tray outwardly towards the peripheral channel or passageway between the tray and the tank wall—this producing an advantageous counter-current flow of sludge and liquor—but the scrapers may be adapted to scrape the sludge into the recycler.

In the operation of this clarifier the chemicals and raw liquor are mixed or agitated in the preliminary mixing zone (sump) with a rotary motion. Chemical reactions start immediately which ultimately result in the formation of sludge, this action being expedited by the partly and fully developed sludge particles which are recycled from points above the tray. The mixture passes upwardly into the mixing zone 4 beneath the tray where additional rotary motion is imparted to it by means of steam tangentially injected through pipe 21 and impelling the liquor with further rotary motion. The centrifugal force produced by this rotary motion tends to cause the mixture undergoing clarification to pass upwardly through the peripheral channel between the tray and the tank wall, across the top of the tray and back into the mixing zone through the recycler, this tendency being assisted, if desired, by means of steam introduced through an additional pipe 19 which discharges downwardly, either in or below the recycler, through an outlet means 18. The rotary motion prevailing in the mixing zone is stilled by the stilling baffles installed between the zones, so that the flow is merely upward in the peripheral channel, and inward over the tray. The upflow in the peripheral channel combined with the agitation and recycling is sufficient to suspend a bed of sludge extending throughout the mixing zone, extending upwardly through the peripheral channel and across the top of the tray to about the level A—A. The partially flocculated sludge in the bed above the tray as well as the liquor is thus recycled to be mixed with the raw liquor, chemicals and more fully developed sludge in the mixing zone beneath the tray.

It will be seen that the sludge bed-clear liquor interface, adjacent the level A—A extends entirely across the horizontal cross section of the clarifier and that the recycling tends to distribute the upflow through this interface uniformly without the formation of any boil-ups. Sludge settles on top of the tray but is scraped off by the slow motion of the scrapers 3 driven by shaft 33. The heavier particles of sludge eventually collect in the sump 6, finally being drawn off through pipe 10. The clear liquor flows out of the top of the tank, through the draw-off or launder 11.

During the mixing actions which take place in the sump and in the mixing zone and also during the passage of the liquor through the confined space between the tray and the tank wall, chemical reactions are taking place in the liquor which result in the formation of insoluble compounds. When first formed these compounds are in solution but tend to crystallize or to separate as solids from solution. The sludge particles in the mixing zone serve as foci of crystallization and, owing to the large number of sludge particles present and their intimate admixture with the raw liquor the insoluble compounds formed by chemical reaction crystallize or precipitate on these foci. Supersaturation of the liquor with the insoluble compounds is prevented. The sludge particles begin to "develop," that is, they increase in size by accretion and agglomeration. When fully developed they tend to settle or to separate by gravity from the liquor. Intimate mixing insures substantial equality of size and of degree of development of the sludge particles at all points.

As the liquor rotates below the tray and passes upwardly through the passage between the tray and the tank the bulk of the sludge particles entrained by the flow have a size such that the suspending action of the flow is just greater than the attraction of gravity. But when these sludge particles, most of which are substantially completely developed, reach the large and relatively quiescent zone above the tray, they tend to fall by gravity with less obstruction. We allow sedimentation of the full developed particles upon the false bottom or tray. While most of the particles may be settleable as they enter the clarification chamber at the periphery thereof, there is generally a remainder of small and light particles, which are quite difficult to remove from the liquid. It is particularly in view of such very small and light particles that we prefer to maintain a partial suspension above the false bottom 2 as well as below the same, which partial suspension desirably includes particles of intermediate size and weight as well as the smallest and lightest ones, which are to be built up and removed. On the other hand we prefer to cause and allow prompt sedimentation of the very largest particles, because these are less efficient than the intermediate ones, in aiding the final development of the smaller particles entering the clarification zone. Under the conditions maintained in our clarification zone, there is a certain maximum size and weight which can be reached by the particles, as a rule. The most developed particles are therefore less subject to growth by accretion, and less suitable as a contact material, than the intermediate ones.

Thus there are particle suspending, building, and settling actions present in our clarification zone and the net result of these actions is the formation of a sludge bed with a more or less distinct demarkation between liquor containing suspended sludge and clear liquor. This is called the sludge-clear liquor interface. In our clarifier the combined effect of the upward flow of liquor and the agitation is advantageously controlled in such fashion as to cause this interface to form at a point somewhat above the level of the tray, as explained previously. At this interface the rate of growth and agglomeration of sludge particles reaches a maximum and even the finest particles are filtered out when the clarifier is operating properly. The depth of the sludge bed below this interface which should and can be maintained, depends on a number of conditions well understood in this art, including the type of impurities to be removed from the liquor, the kind of chemicals used, if any, the velocity and temperature of the flow, the size of the particles, which again depends on the pH and other conditions, and so on.

The effect of the central recycler 15 is highly important in that the downward circulation produced by this element causes inward flows above the tray. Such inward flows may be of appreciable quantity and velocity, and in some instances they may equal or exceed the general throughput flow, without disturbing the partial suspension and sedimentation processes described. In fact, unless excessive recycling rates are applied, clarification is benefited. The lines of flow of the liquor undergoing clarification, which might otherwise tend to rise almost vertically from the passage between the tray and the wall, are deflected inwardly in such fashion that the upward flow through the sludge-clear liquor interface is substantially uniform over the entire area of this interface. It is evident that the more nearly uniform the upward flow through this interface, the greater the rate of flow which can be employed without producing turbidity in the clear liquor, i. e. the greater the capacity of the clarifier.

The structure of the embodiment of Figs. 3 and 4 differs from that of Figs. 1 and 2 in that the small sump of this embodiment is not used as a preliminary mixing zone. Substantially radial baffles 13′ between the tray and the tank wall support the tray, which is sloped downwardly towards its periphery. The baffles are also shown slightly sloped from the vertical. A cylindrical baffle 16 depends from the tray having a vertical centerline in common with the tray and being installed between the center and the periphery of the tray; and this, with the tray helps to define a preliminary mixing zone, the raw liquor admixed with chemicals being introduced tangentially through the pipe 8 into this zone. A recycler 15 is provided in the center of the tray and a second cylindrical baffle 17 is mounted slightly below and around the lower end of this recycler, leaving a space there-between for the recycling of the mixture from the preliminary mixing zone which is drawn into the recycler by the injector action of the steam passing through the pipe 19 and distributed downwardly through the ring 18, within the baffle 17. Sludge may be discharged from the sump through pipe 10 or may be collected by collector 14 mounted on the side of the tank and discharged through the pipe 28.

The operation of this modification is very similar to that of Figs. 1 and 2. The raw liquor-chemical mixture is caused to rotate in the preliminary mixing zone inside baffle 16. Part of this mixture passes downwardly through the inner baffle 17 the rest passing directly into the main mixing zone in the lower part of the clarifier. In this main mixing zone the rotary motion is maintained with the air or steam injected through pipe 21, this motion producing sufficient centrifugal force to induce a flow of liquor upwardly through the peripheral flow channel between the tray and the tank wall, across the top of the tray and downwardly through the recycler. The level of the sludge bed, in which the sludge particles are uniformly distributed, is indicated by the line A—A. It is seen that partially developed sludge from the bed above the tray is recycled to be mixed with more fully developed sludge in the main mixing zone. The scrapers 3 are adapted to discharge the sludge deposited on top of the tray into the peripheral flow channel. The clear liquor is drawn off through the central launder 11.

The embodiment of Figs. 5 and 6 differs from the previously described embodiments in the provision of concentric vertical annular baffles or partitions mounted in the upper portion of the tank to guide the circulating liquid into a horizontal direction as it enters the clarification zone, while avoiding objectionable obstructions and settling surfaces. A partition 36 is so provided which extends from the top of the tank downward to a point a short distance above the tray. A second and outer baffle 35 may be added, integrally secured to the edge of the tray and extending from this edge upward to a point below the top of the tank, thereby leaving a sinuous space through which the mixture of raw water and sludge passes on its way to the central clarifying zone. The clarifier is advantageously operated in such fashion that the sludge-clear liquor interface is maintained at a level slightly above the lower edge of the baffle 36 as shown at A—A. Rotary motion is produced beneath the tray by tangential introduction of a raw liquor, the velocity of which can be controlled by means of the pump 20. The rotary motion can be increased to any desired extent in the center of the mixing chamber by the use of a horizontally rotatable impeller 21-M driven by a motor reducer 21-A on top of the tank, through a vertical, central shaft 21-B. The central sludge collector which is incorporated in the tray 2 serves also as a recycler of sludge, which can be passed out of the clarifier by means of pipe 28 or into the suction of the impeller 21-M in the mixing zone through openings 31. The sweeps 3 operating on the tray slowly propel precipitated sludge into the central collector, being driven by a suitable mechanism 33-A, through a drum 33-B surrounding the central shaft. Special braces 29 are provided at the periphery of the tray, while intermediate posts 29-A can also be provided to support part of the weight of the tray. These posts 29-A are located around the rotatable impeller 21-M. This embodiment of our clarifier is particularly adapted for use with raw liquors which produce a light flocculent sludge and where inward injection of the liquor into a very quiescent clarifying space, pursuant to thorough agitation at decreasing rates, is required. If desired baffle 35 can be omitted.

The space between baffle 36 and the tank wall serves to still the rotary motion of the liquor. For this purpose, stilling baffles 13-A are installed substantially radially and vertically in said space; these baffles cooperating to support the tray 2, partition 36, and, in some cases, partition 35. The space above the baffles 13-A may serve for the accumulation of scum and other light impurities.

What we claim is:

1. A tank for liquid clarification comprising a flat, circular tray concentrically and horizontally installed between the bottom and top of the tank, spaced from the wall of the tank, and having a central opening, to form a flocculation compartment below said tray, a clarification compartment above said tray, a continuous, annular, peripheral flow channel between said compartments, and a central flow channel between said compartments; impeller means adapted to rapidly rotate the liquid in said flocculation compartment and to recycle liquid from said flocculation compartment through said annular flow channel, over said tray, and back through said central flow channel; substantially radial and vertical stilling baffles installed in said peripheral flow channel to prevent continued, rapid rotation of said liquid recycled over said tray, secured to the wall of the tank and to said tray and supporting at least part of the weight of said tray; sludge scraper means adapted to rotate over said tray; means to slowly rotate said sludge scraper means; inlet means for liquid to be treated and any chemical reagents required, discharging into said flocculation compartment; outlet means for treated and clarified liquid adjacent the top of said clarification compartment; and outlet means for settled sludge in a lower part of the tank.

2. A tank according to claim 1 wherein the bottom has a central sump; said inlet means discharging into said central sump.

3. A tank according to claim 1 comprising an annular partition depending from the edge of said tray; said inlet means discharging into an upper, central part of the tank below said tray, inside said annular partition.

4. A tank according to claim 1 comprising an annular partition concentrically installed in a peripheral part of said clarification compartment and extending from the top of the tank downwards to adjacent but above said tray.

5. A tank according to claim 1 comprising a first annular partition upwardly extending from the edge of said tray to below the top of the tank, and a second annular partition, concentrically installed within the first and extending from the top of the tank downwards to adjacent but above said tray.

6. A tank according to claim 1 wherein said impeller means comprises a rotatable member below said tray, a shaft vertically extending through the center of the tank, and means to rotate said shaft; said tank comprising posts in said flocculation chamber, located around said rotatable member, and supporting part of the weight of said tray.

HENRY C. PARKER.
FRANK D. PRAGER.